US011231676B2

(12) United States Patent
Rajbhandari

(10) Patent No.: US 11,231,676 B2
(45) Date of Patent: Jan. 25, 2022

(54) DIRECT MEMORY ACCESS BASED HARDWARE DESKEW

(71) Applicant: Hewlett-Packard Development Company, L.P., Spring, TX (US)

(72) Inventor: Ajit Rajbhandari, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 330 days.

(21) Appl. No.: 16/462,727

(22) PCT Filed: Jan. 31, 2017

(86) PCT No.: PCT/US2017/015853
§ 371 (c)(1),
(2) Date: May 21, 2019

(87) PCT Pub. No.: WO2018/143950
PCT Pub. Date: Aug. 9, 2018

(65) Prior Publication Data
US 2019/0369542 A1 Dec. 5, 2019

(51) Int. Cl.
G03G 15/00 (2006.01)
G06F 13/28 (2006.01)
B41J 2/47 (2006.01)
H04N 1/387 (2006.01)
G06K 9/36 (2006.01)

(52) U.S. Cl.
CPC ............ *G03G 15/6567* (2013.01); *B41J 2/47* (2013.01); *G03G 15/556* (2013.01); *G06F 13/28* (2013.01); *G06K 9/36* (2013.01); *H04N 1/3878* (2013.01); *G03G 2215/00561* (2013.01)

(58) Field of Classification Search
CPC ............ G03G 15/6567; G03G 15/556; G03G 2215/00561; G06K 9/36; H04N 1/3878; B41J 2/47; G06F 13/28; G11B 9/00
USPC ......................................................... 382/289
See application file for complete search history.

(56) References Cited

U.S. PATENT DOCUMENTS

| | | | |
|---|---|---|---|
| 4,370,641 | A | 1/1983 | Kantor et al. |
| 5,233,168 | A | 8/1993 | Kulik et al. |
| 5,452,374 | A | 9/1995 | Cullen et al. |
| 6,097,855 | A | 8/2000 | Levien |
| 6,807,320 | B1 | 10/2004 | Sawada |

(Continued)

FOREIGN PATENT DOCUMENTS

| | | |
|---|---|---|
| JP | 2012183805 A | 9/2012 |
| JP | 2013097156 A | 5/2013 |

OTHER PUBLICATIONS

Al-Bayatti. et al., Document Skew Detection and Correction Algorithm Using Wavelet and Radon Transforms, 2009, J. of al-anbar university for pure science V3:#1—6 pages.

*Primary Examiner* — Neil R McLean
(74) *Attorney, Agent, or Firm* — Mannava & Kang

(57) ABSTRACT

In some examples, direct memory access based hardware deskew may include ascertaining scanned data associated with scanning of a physical medium by using a reading direct memory access to step through the scanned data based on a skew angle associated with an orientation of the physical medium relative to a scan bar that is to perform the scanning of the physical medium. Further, direct memory access based hardware deskew may include modifying the scanned data to reduce the skew angle associated with the orientation of the physical medium.

20 Claims, 12 Drawing Sheets

(56) References Cited

U.S. PATENT DOCUMENTS

| | | |
|---|---|---|
| 7,668,404 B2 | 2/2010 | Adams et al. |
| 8,593,683 B2 | 11/2013 | Ikari |
| 8,665,299 B2 | 3/2014 | Miyadera et al. |
| 9,160,885 B2 | 10/2015 | Ramachandrula et al. |
| 2006/0039628 A1* | 2/2006 | Li .................. H04N 1/3878 382/289 |
| 2006/0197038 A1* | 9/2006 | Park .................. G01N 21/86 250/559.37 |
| 2008/0024823 A1* | 1/2008 | Nakagawa ............ H04N 1/047 358/1.16 |
| 2009/0109503 A1 | 4/2009 | Namba |
| 2011/0135362 A1* | 6/2011 | Cho .................. G03G 15/607 399/372 |

\* cited by examiner

DIRECT MEMORY ACCESS BASED HARDWARE DESKEW

BACKGROUND

A printing device, such as a printer, multifunction printer, and/or other such devices may be described as a peripheral which is used to make a persistent human readable representation of graphics or text on physical media such as paper. A printing device may include various components to move the physical media from a first location, such as an input tray, to a second location, such as an output tray. A printing device may perform various operations, such as printing, scanning, etc.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
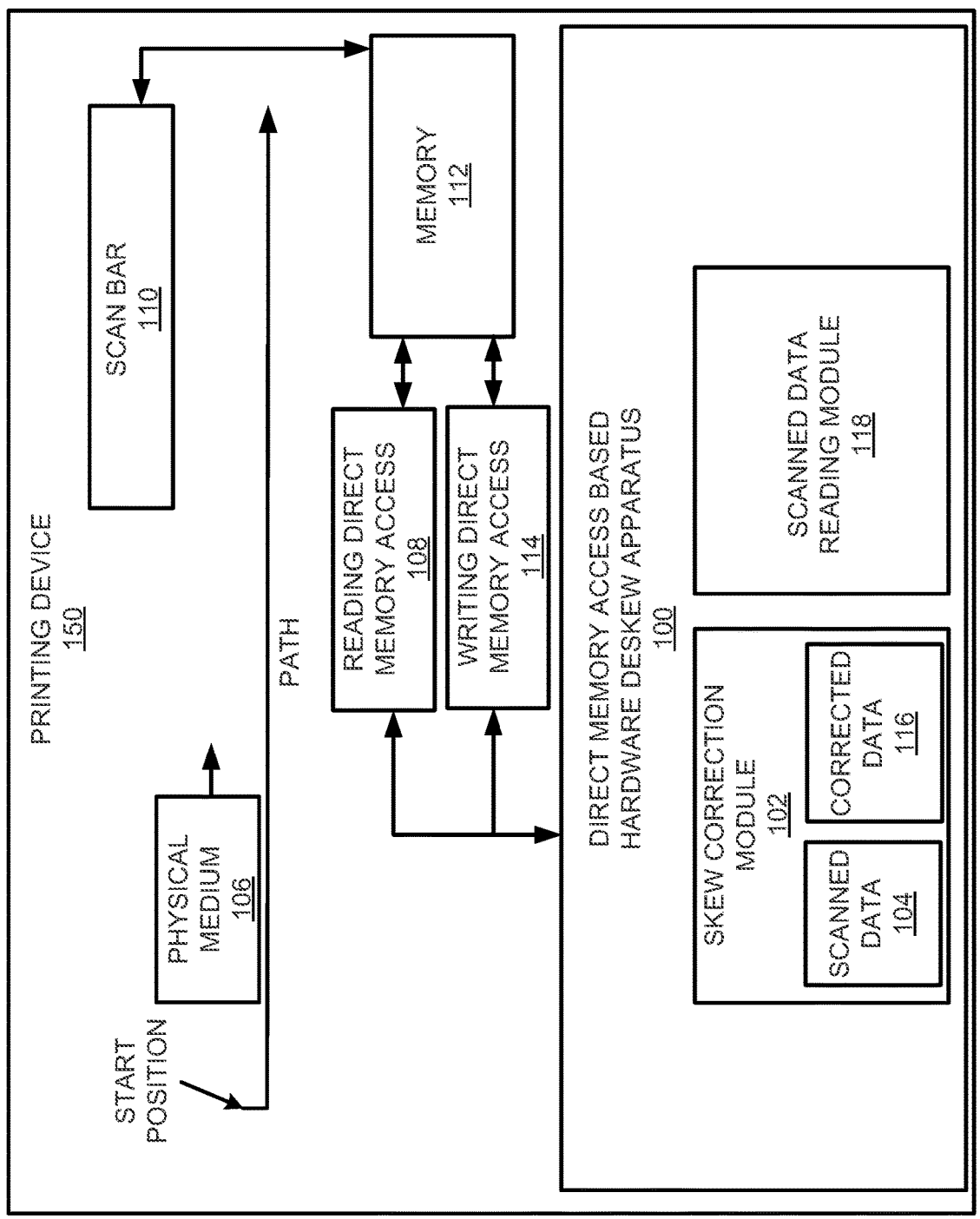
FIG. 1 illustrates a layout of a direct memory access based hardware deskew apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A direct memory access (DMA) based hardware deskew apparatus, a method for direct memory access based hardware deskew, and a non-transitory computer readable medium having stored thereon machine readable instructions to provide direct memory access based hardware deskew are disclosed herein. The apparatus, method, and non-transitory computer readable medium disclosed herein provide for correction of skew in a physical medium being scanned through an automatic document feeder (ADF) by reading data associated with scanning of the physical medium from memory using direct memory access. In this regard, the direct memory access may read the data associated with the scanning of the physical medium in such a way that the reading operation steps through the memory based on a skew angle of the physical medium.

With respect to hardware deskew, printing devices such as multi-function printers, all-in-one printers, etc., may include an automatic document feeder. When a physical medium is fed through the automatic document feeder, the physical medium may be aligned by a mechanical device to minimize the skew angle between a scan bar and the physical medium. The automatic document feeder may provide for feeding of the physical medium to a scanner as straight as possible so that the scan bar of the scanner is perpendicular to the physical medium. However, when the physical medium is not perpendicular to a desired level to the scan bar, the scanned physical medium may include skew. The skewness may be measured in degrees, and may be corrected electronically.

The electronically corrected skew may eliminate the need for a mechanical device to align the physical medium to the scan bar, or to correct skew associated with the physical medium that includes some skew despite the alignment by the mechanical device. Electronic correction of the skew can be challenging as the physical medium is being fed through the automatic document feeder.

In order to electronically correct the skew as a physical medium is being fed through the automatic document feeder, for the apparatus, method, and non-transitory computer readable medium disclosed herein, a hardware deskew may be implemented. The hardware deskew may be described as an operation to correct a skew of a physical medium (e.g., skewed pixels) as the physical medium is being passed through the automatic document feeder of a printing device. That is, the hardware deskew operation may be implemented to correct the skew in the physical medium as the physical medium is being scanned through a scanner of a printing device. The hardware deskew operation may be described as a pipeline system as the physical medium is being scanned, and electronic data is written into memory. In this regard, a dedicated reading direct memory access may be triggered by a skew correction module to read data associated with scanning of the physical medium (i.e., scanned data) from the memory, and forward the scanned data to the skew correction module. The skew correction module may correct (i.e., modify) the scanned data to eliminate (i.e., reduce) the skew, and a dedicated writing direct memory access may write corrected data back to the memory.

According to an example, the scanned data that is in the memory may be written from left to right from lower address to the left, and higher address to the right. If there is some skew in the physical medium, actual scanned data in the memory may also include skew. In order to correct the skew associated with the scanned data (i.e., the skewed data), the reading direct memory access may read the scanned data in such a way that the reading direct memory access steps through the memory based on the skew angle of the physical medium. In this regard, a scanned data reading module may determine a step size to read the memory, and utilize the reading direct memory access to step through the memory based on the step size that is being read. At the memory side of the reading direct memory access, the scanned data reading module may determine aspects such as the address in memory, the amount of scanned data to be read in a memory BUS transaction (direct memory access burst size), a number of BUS transactions for a step, movement through memory locations to fetch the scanned data, etc. A front end of the reading direct memory access may divide the bursts of the scanned data, and send exact pixels (i.e., data) to the skew correction module for skew correction. The scanned data reading module may also insert blend pixels as needed.

For the apparatus, method, and non-transitory computer readable medium disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of a direct memory access based hardware deskew apparatus (hereinafter also referred to as "apparatus 100"), according to an example of the present disclosure.

In some examples, the apparatus 100 may include or be provided as a component of a print server for processing print data before the processed print data is transmitted to a printing apparatus, such as an inkjet printer, or any type of printing device. Alternatively, as illustrated in FIG. 1, the apparatus 100 may be a component of a printing device.

Referring to FIG. 1, the apparatus 100 may include a skew correction module 102 to ascertain scanned data 104 associated with scanning of a physical medium 106 by using a reading direct memory access 108 to step through the scanned data 104 based on a skew angle associated with an orientation of the physical medium 106 relative to a scan bar 110 that is to perform the scanning of the physical medium 106. In this regard, the dedicated reading direct memory access 108 may be triggered by the skew correction module 102 to read the scanned data 104 from a memory 112. The scan bar 110 may be provided as a component of a printing device 150.

The skew correction module 102 may modify the scanned data 104 to reduce the skew angle associated with the orientation of the physical medium 106. In this regard, the skew correction module may modify the scanned data 104 to reduce the skew angle, and a dedicated writing direct memory access 114 may write corrected data 116 back to the memory 112.

A scanned data reading module 118 may determine a step size to ascertain the scanned data 104, where the step size includes two pixels to a size of an image determined from the scanning of the physical medium 106. Further, the scanned data reading module 118 may determine, based on the step size, a burst size that corresponds to a length of the scanned data 104 that is to be ascertained.

The skew correction processing by the skew correction module 102 may utilize the reading direct memory access 108 and the writing direct memory access 114. The reading direct memory access 108 may also be designated as a dedicated stepping reading direct memory access 108, which is provided for the purpose of skew correction with respect to scanning of the physical medium 106. The reading direct memory access 108 may be configured to follow a skewed line associated with the scanned physical medium in the memory 112. Each step size for reading the scanned data 104 associated with the scanned physical medium in the memory 112 may be two to a size of an image of the scanned physical medium 106. The step sizes may be represented as a number of pixels of the image of the scanned physical medium 106.

For the apparatus 100, the reading direct memory access 108 may be specified based on the following parameters. For example, the reading direct memory access 108 may include consistent performance and efficiency. The reading direct memory access 108 may be specified to include process steps that are to fit in a finite resource. The reading direct memory access 108 may be specified to include steps that may include two pixels to all of the pixels in the image of the scanned physical medium 106 in a row. The reading direct memory access 108 may be specified to insert blend pixels as needed at the beginning of a row. The reading direct memory access 108 may be specified to insert blend pixels at a top of a page associated with the image of the scanned physical medium 106. The reading direct memory access 108 may be specified to process an entire page while traversing through left x, left y. The reading direct memory access 108 may be specified to process negative and positive angles associated with the image of the scanned physical medium 106. The reading direct memory access 108 may be specified to process a line of scanned data 104 that is written in several locations by moving forward to a location, and moving back to a previous location for next row processing. The reading direct memory access 108 may be specified to process red, green and blue (RGB) channels. Further, the reading direct memory access 108 may be specified to send an exact number of pixels to the skew correction module 102.

Figure 2:
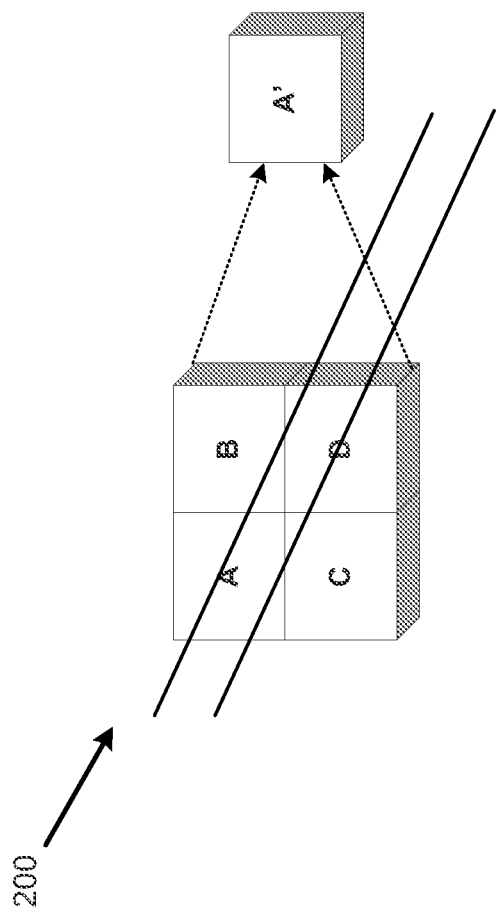
FIG. 2 illustrates a 2×2 pixel window for deskew interpolation correction to illustrate operation of the direct memory access based hardware deskew apparatus of FIG. 1, according to an example of the present disclosure.

FIG. 2 illustrates a 2×2 pixel window for deskew interpolation correction to illustrate operation of the apparatus 100, according to an example of the present disclosure.

Referring to FIG. 2, the skew correction module 102 may perform a weighted average of four adjacent pixels of an image of the scanned physical medium 106 by generating a 2×2 pixel window 200. Two pixels are from the top row, and the other two pixels are from the bottom row as shown at 200. For the example of FIG. 2, the weighted average of the four adjacent pixels (A, B, C, and D) may be used to translate to a pixel A'.

Figure 3A:
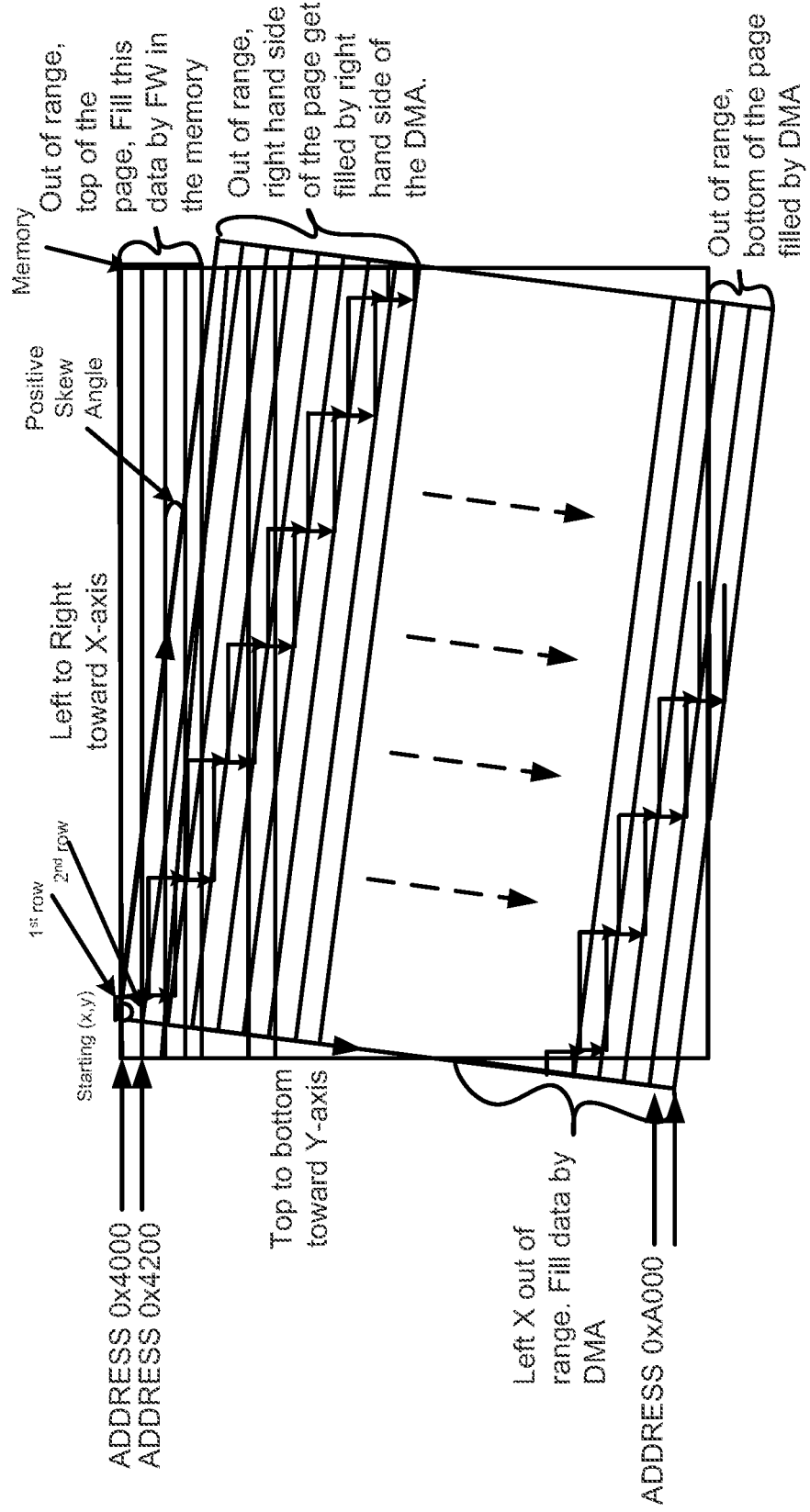
FIG. 3A illustrates positive degree angle image skew to illustrate operation of the direct memory access based hardware deskew apparatus of FIG. 1, according to an example of the present disclosure.
Figure 3B:
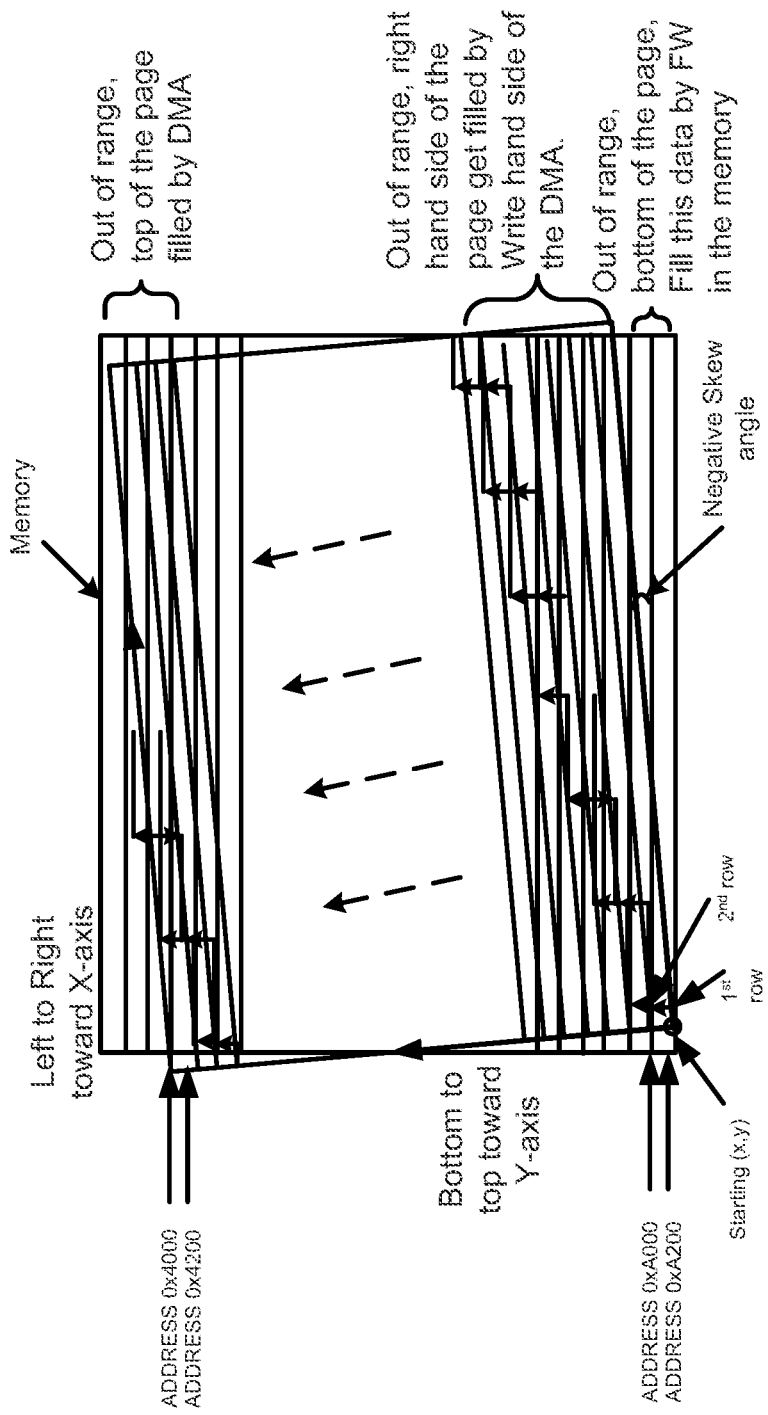
FIG. 3B illustrates negative degree angle image skew to illustrate operation of the direct memory access based hardware deskew apparatus of FIG. 1, according to an example of the present disclosure.

FIG. 3A illustrates positive degree angle image skew to illustrate operation of the apparatus 100, according to an example of the present disclosure. Further, FIG. 3B illustrates negative degree angle image skew to illustrate operation of the apparatus 100, according to an example of the present disclosure.

Referring to FIG. 3A (and similarly for FIG. 3B), in order to provide the skew correction module 102 with four adjacent pixels, the reading direct memory access 108 may follow a pair of skewed lines (i.e., rows) in the memory 112. In order to follow the skewed lines, the reading direct memory access 108 may track x and y co-ordinates for every pixel. These coordinates may be based on the configuration values assigned to the scanned data associated with the physical medium 106, and are based on the skew angle. Once the two rows have been processed, the skew correction module 102 may process the next two rows overlapping the $2^{nd}$ row from the previous 2-row operation.

Figure 4:
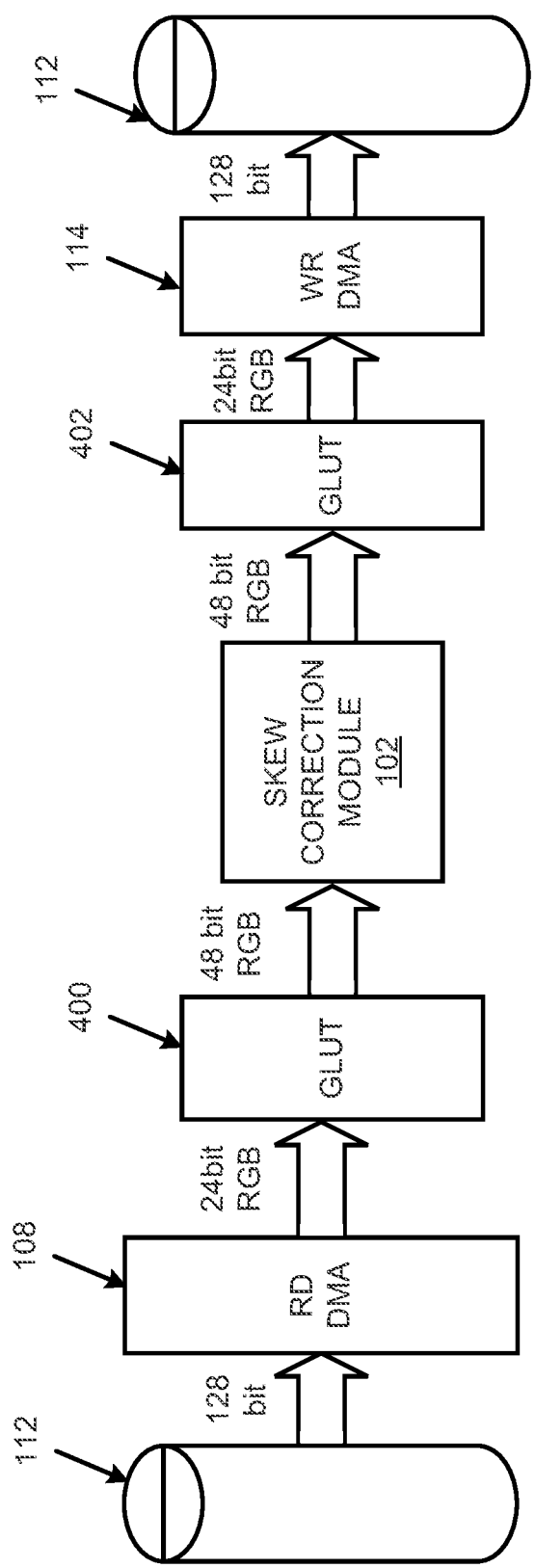
FIG. 4 illustrates a logic flow for hardware deskew to illustrate operation of the direct memory access based hardware deskew apparatus of FIG. 1, according to an example of the present disclosure.
Figure 5:
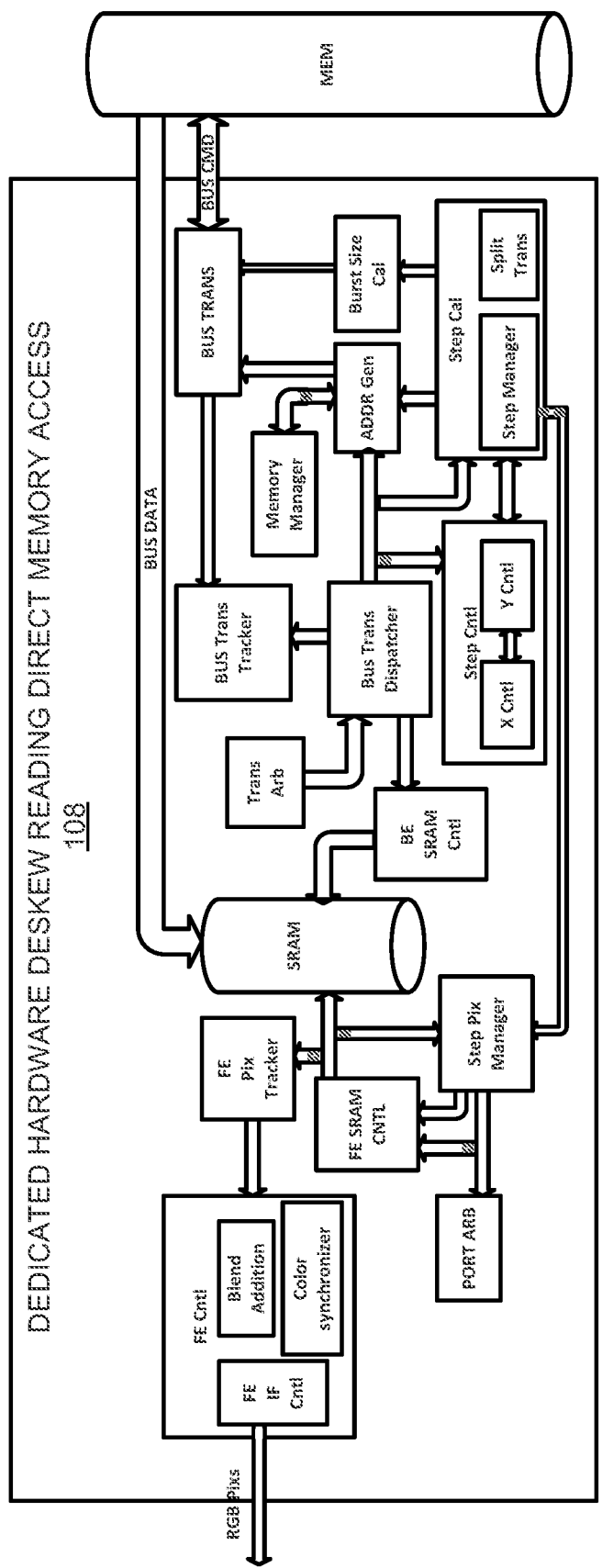
FIG. 5 illustrates a dedicated hardware deskew reading direct memory access to illustrate operation of the direct memory access based hardware deskew apparatus of FIG. 1, according to an example of the present disclosure.

FIG. 4 illustrates a logic flow for hardware deskew to illustrate operation of the apparatus 100, according to an example of the present disclosure. Further, FIG. 5 illustrates a dedicated hardware deskew reading direct memory access to illustrate operation of the apparatus 100, according to an example of the present disclosure.

Referring to FIG. 4, the reading direct memory access 108 may forward the scanned data 104 ascertained from the memory 112 to the skew correction module 102. The scanned data 104 received by the skew correction module 102 may be in a 48 bit RGB (red, green, and blue) format. The dedicated writing direct memory access 114 may write the corrected data 116 (i.e., the modified data) back to the memory 112. The hardware deskew as illustrated in FIG. 4 may include the reading direct memory access 108 as illustrated in FIG. 5. Further, the hardware deskew as illustrated in FIG. 4 may include a Gamma decompressor (i.e., the GLUT at 400), the skew correction module 102, a Gamma compressor (i.e., the GLUT at 402), and the writing direct memory access 114.

The physical medium 106 may include two types of skew, that is positive or negative skew. When the physical medium 106 is scanned, the physical medium 106 may be skewed left to right or right to left. According to an example, left to right skew may be denoted positive angle skewed, and right to left skew may be denoted negative angle skewed. A positive angle skewed physical medium may be processed from top down, while a negative angle skewed physical medium may be processed from bottom up.

The reading direct memory access 108 may start the deskew process by determining the exact location of the $1^{st}$ pixel in the memory 112. This $1^{st}$ pixel in the memory 112 may refer to the top left x and y coordinate of the scanned physical medium 106 for a positive angle skewed page or the bottom left x and y coordinate of the scanned physical medium 106 for a negative angle skewed page. According to an example, the $1^{st}$ pixel in the memory 112 may be above (for a positive angle skewed) or below (for a negative angle skewed) the physical medium 106. According to an example, the reading direct memory access 108 may process the scanned data 104 from left to right in the memory 112, regardless of whether the skewed physical medium 106 is skewed at a positive angle or negative angle.

The pixel in the memory 112 for the starting point to start reading of the scanned data 104 may be referred by a byte address. The byte address may be provided to the reading direct memory access 108. According to an example, the byte address may be 16 bytes aligned as the reading direct memory access 108 reads from a 128 bit (16 bytes) memory BUS. The reading direct memory access 108 may utilize this information to determine the amount of scanned data 104 to read from the memory 112 when a command is sent to the BUS.

The length of the scanned data 104 that is to be fetched by the reading direct memory access 108 from the memory 112 for a transaction may be designated as a burst size. The burst size may depend on the step size or how many pixels are in a step for a particular skew. This length of the scanned data 104 that is to be fetched by the reading direct memory access 108 from the memory 112 may be measured in bytes.

The angle for a physical medium 106 may be constant. However, the step sizes associated with reading of the scanned data 104 may differ by a certain number of pixels (e.g., two pixels), depending on where the step is in the physical medium 106.

Figure 6:
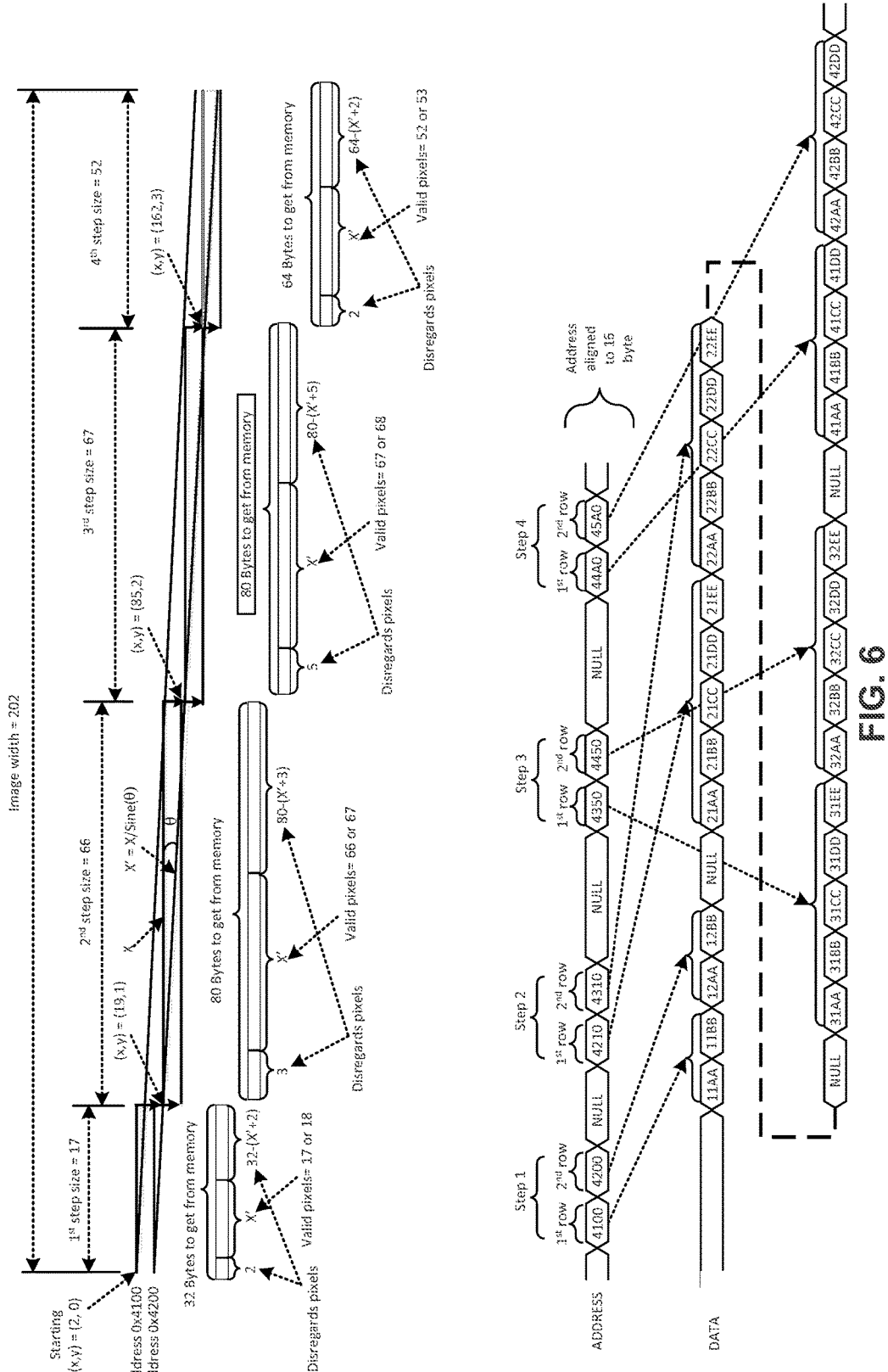
FIG. 6 illustrates burst size determination to illustrate operation of the direct memory access based hardware deskew apparatus of FIG. 1, according to an example of the present disclosure.

FIG. 6 illustrates burst size determination to illustrate operation of the apparatus 100, according to an example of the present disclosure.

Referring to FIG. 6, the scanned data reading module 118 may continuously or intermittently determine the burst size that is needed for a particular reading direct memory access 108 transaction. The burst size may be determined based on the step size. For example, in accordance with the examples of FIG. 6, a step size of 65 pixels (where a pixel is a byte length) may need a burst size of (65+1)/16, which translates to five (a whole number). The additional pixel may cover the entire 2×2 window for the last pixel.

Based on the burst size and the byte address, the scanned data reading module 118 may generate two read commands to the memory BUS. The address of the second command may include an offset by an image size of the scanned physical medium 106. In return, there are two sets of data that may be obtained from the memory 112. This data may include the valid data which is sent to the skew correction module 102. The $1^{st}$ read command may be for the top ($1^{st}$) row, and the $2^{nd}$ read command may be for the $2^{nd}$ row. In return, there are two sets of burst size specified data that is obtained from the memory 112. These sets of data may include pixels that cover multiple 2×2 pixel windows. For example, two burst size data that are received from the memory 112 may generate sixty four 2×2 windows which generates 64 corrected pixels. Initially, the first step size may be programmed and thereafter all other step sizes may be determined by the scanned data reading module 118.

Figure 7:
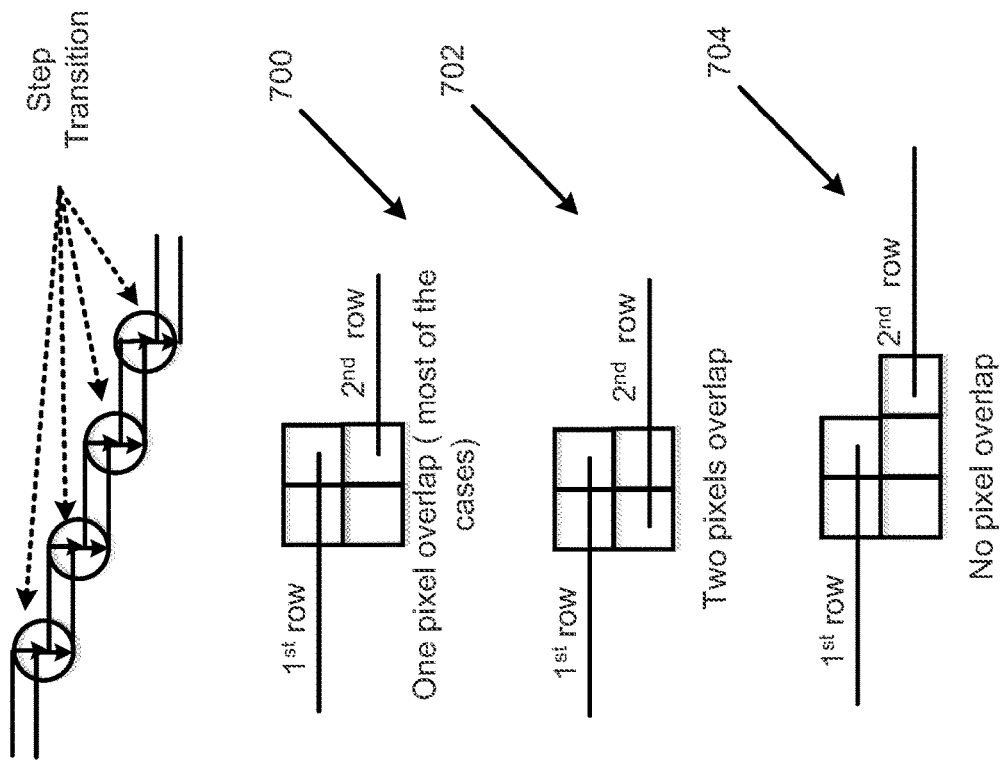
FIG. 7 illustrates three conditions at a step transaction to illustrate operation of the direct memory access based hardware deskew apparatus of FIG. 1, according to an example of the present disclosure.

FIG. 7 illustrates three conditions at a step transaction to illustrate operation of apparatus 100, according to an example of the present disclosure.

Referring to FIG. 7, depending on where the skewed line crosses the pixel, the beginning of the next step may fall in the last pixel, the following pixel after the last pixel, or one pixel before the last pixel of the previous step. The scanned data reading module 118 may determine the next step before it generates the next memory BUS command. This process may occur at every step until the end of the line has reached. Once the processing of the line is complete, the processing may proceed to the next lines with the $1^{st}$ row being the previous $2^{nd}$ row, and the next row in the memory 112 being the new $2^{nd}$ row. The processing may continue until the end of the physical medium 106. The condition at 700 represents a single pixel overlap, the condition at 702 represents two pixels overlap, and the condition at 704 represents no pixel overlap.

The apparatus 100 may provide for consistent performance by using two swing buffers made from static random-access memories (SRAMs) to store a maximum burst size length. For example, in order to maintain a maximum of 256 byte burst length (16 bytes per beat (128 bits data line), maximum of 16 beats per burst), the SRAM may be configured to be 128 bits wide and 32 rows deep. The 32 rows may provide for processing of two rows in the memory 112 at a time. In two clock cycles (to give time for mathematical computation to complete), two additional memory BUS commands may be generated. These commands may be provided for the next step or for the same step if the step is larger than the maximum burst size. This aspect of the apparatus 100 may be denoted as step split transactions. For example, if a step size is 2014 bytes, a maximum transfer for this step size may be 256 bytes. Thus, in order to complete processing of a step, there are 2014/256 memory command transactions.

As long as the SRAM is empty and entire physical medium 106 has not been processed, commands may be generated. In this regard, the reading direct memory access 108 may need to have the next step or the next memory transaction ready. In the absence of two swing buffers, there may be no need to generate next two commands in the next two clock cycles since there is no buffer (SRAM location) to store the scanned data 104 that originates from the memory 112. The swing buffers may facilitate the continuous requesting of read commands to the memory BUS.

There are four sets of conditions to fill the scanned data 104 that the scanner of the printing device 150 did not scan due to a skewed physical medium 106. Each side of a skewed physical medium 106 may be handled differently. For example, a top or bottom of a physical medium 106 may be filled in the memory 112, and the reading direct memory access 108 may read a line through that location. With respect to a starting location for the reading direct memory access 108, some data may be allocated in the memory, and the reading direct memory access 108 may read the data as the reading direct memory access 108 is reading the skew line. With respect to the left hand side, when the reading direct memory access 108 is traversing through left y, and the y co-ordinate goes off the physical medium 106, that means that the scanner has not scanned the left hand side of the physical medium 106. In this case, the reading direct memory access 108 may apply blend or fill pixels for that space. The knowledge of these conditions may be passed to the skew correction module 102.

With respect to processing of a skewed image of the scanned physical medium 106 in the memory 112, according to an example, an entire set of the scanned data 104 for the scanned physical medium 106 may be written in the memory 112. In this case, the reading direct memory access 108 may process the entire image of the scanned physical medium 106 without firmware intervention. In this regard, the reading direct memory access 108 may process the scanned data 104 two rows at a time from the beginning of the scanned physical medium 106 to the end of the scanned physical medium 106, traversing through left y along the left hand side of the scanned physical medium 106, and following a skew line to the right tracking x coordinate. The reading direct memory access 108 may also detect if there is an overlap of a row and process the row twice as needed.

When an image of the scanned physical medium 106 is written into the memory 112, the entire image may be written into a designated space called a buffer, which may be allocated by the firmware. The buffer size may be based on the number of rows. The firmware may set up buffer space at an address location to write data into. The next buffer space may be set to a separate address location.

Figure 8:
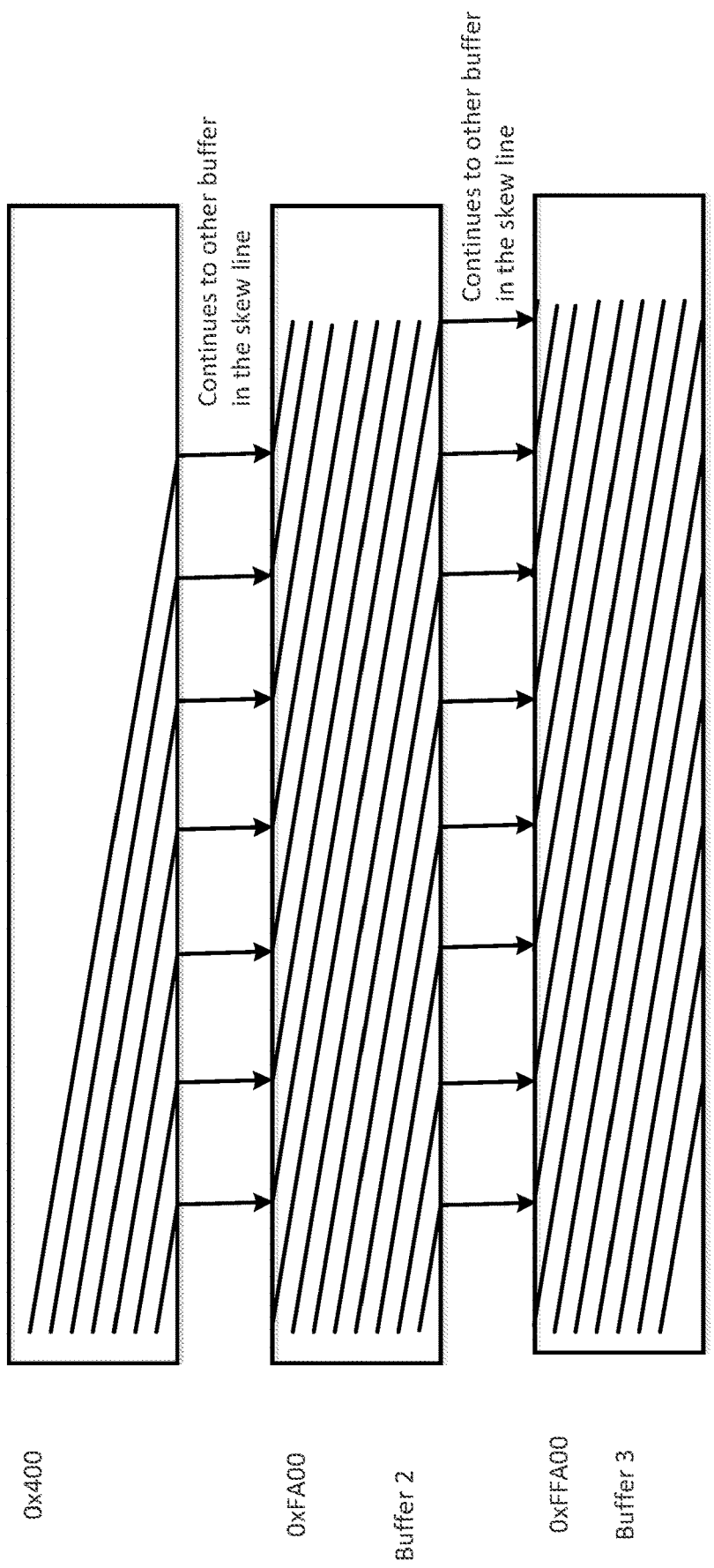
FIG. 8 illustrates buffer implementation to illustrate operation of the direct memory access based hardware deskew apparatus of FIG. 1, according to an example of the present disclosure.

FIG. 8 illustrates buffer implementation to illustrate operation of the apparatus 100, according to an example of the present disclosure. Firmware may program the initial buffer location (the addresses shown in FIG. 8 at the left hand side) and how many lines are in the buffer. The reading direct memory access 108 may determine the exact location of the next pixel in the next buffer as it is traversing the skewed line. According to an example, a line may cross up to m (e.g., 11) buffers, and the reading direct memory access 108 may have m (e.g., 11) buffer location entries with information on how many lines are in each buffer.

Referring to FIG. 8, given these locations, the reading direct memory access 108 may access the address location of a starting buffer, process the skewed row in the memory 112 as discussed above, maintain a record of steps that have been taken, and once an end of the buffer is reached, the reading direct memory access 108 may access the next buffer in the line. These steps by the reading direct memory access 108 may be taken until the end of the row.

Since there are two rows simultaneously being processed, two sets of counters may be used to track two rows as top pixels may be from one buffer, and bottom pixels may be from another buffer. Once, the end of row occurs, for the next two rows, the reading direct memory access 108 may go through the top of the buffer or the following buffer if all of the rows of the buffer have been processed.

The reading direct memory access 108 may handle red, green and blue channels in parallel. In this regard, the memory BUS may receive commands for a red channel, then a green channel, and then a blue channel. Data for each channel may be written separately in the memory 112. In this regard, the data for each channel may include its own buffer and space in the memory 112, and the firmware may control these buffers. No separate calculations may be performed for separate color channels since all colors follow the same skew line.

Figure 9:
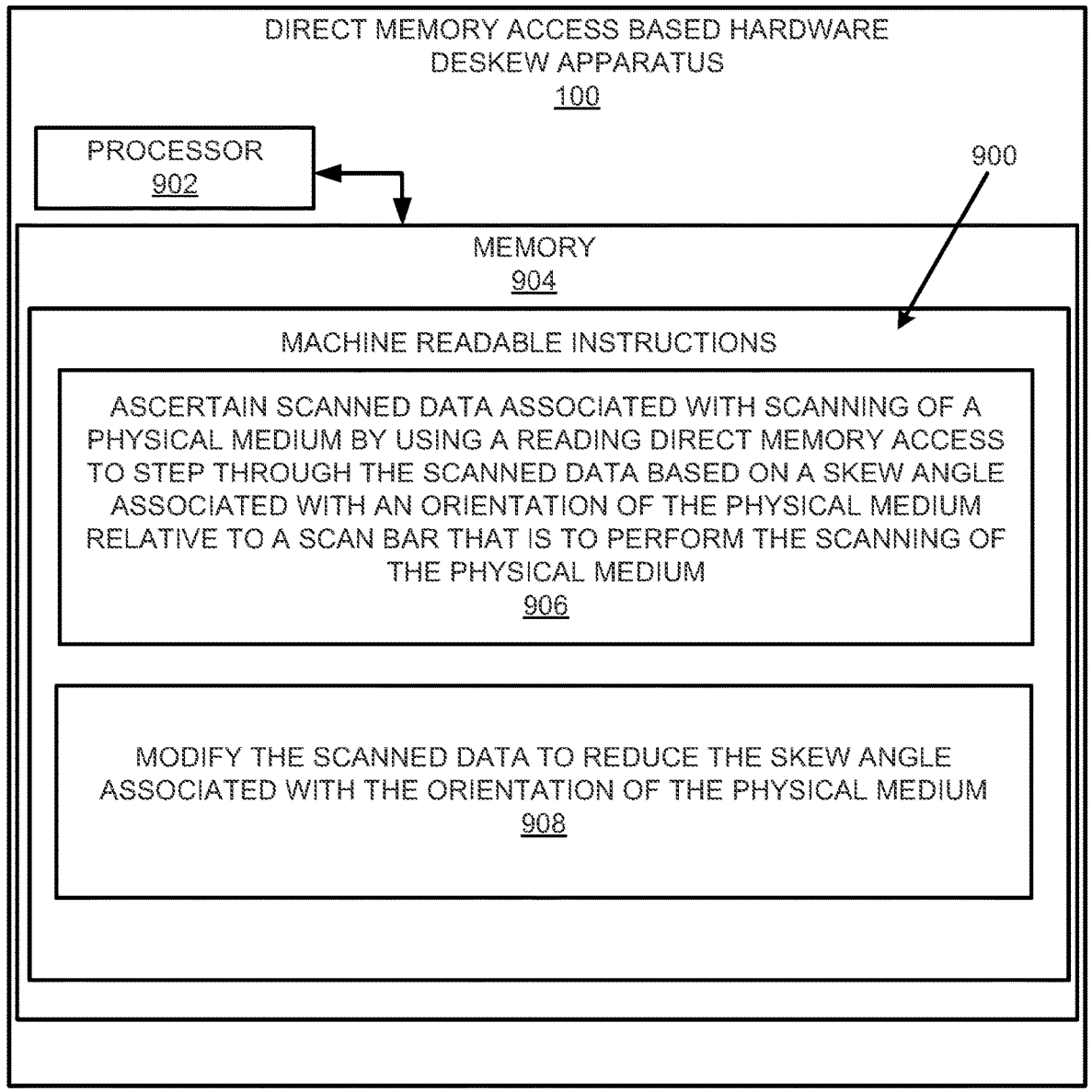
FIG. 9 illustrates a block diagram for direct memory access based hardware deskew, according to an example of the present disclosure.
Figure 10:
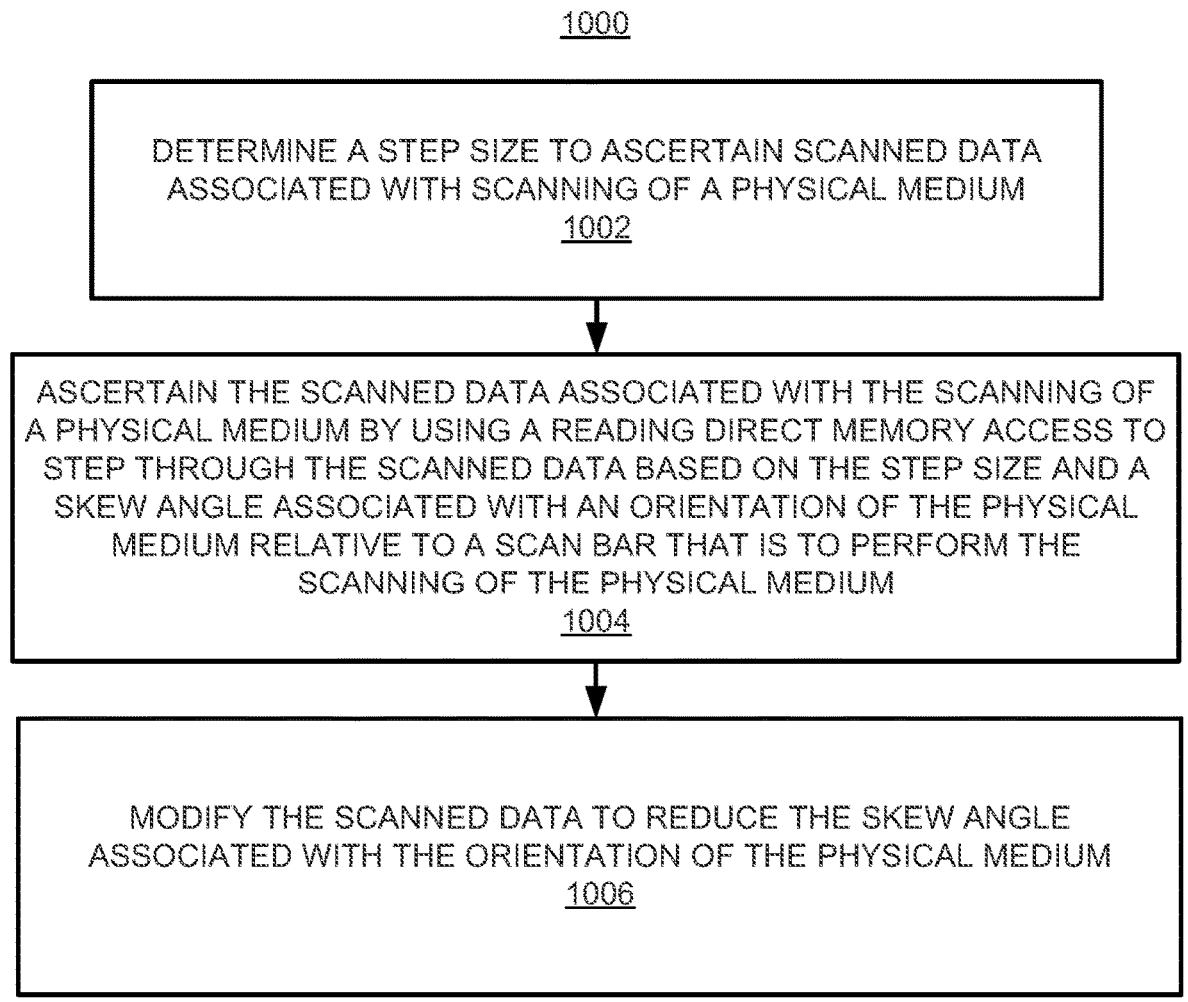
FIG. 10 illustrates a flowchart of a method for direct memory access based hardware deskew, according to an example of the present disclosure.
Figure 11:
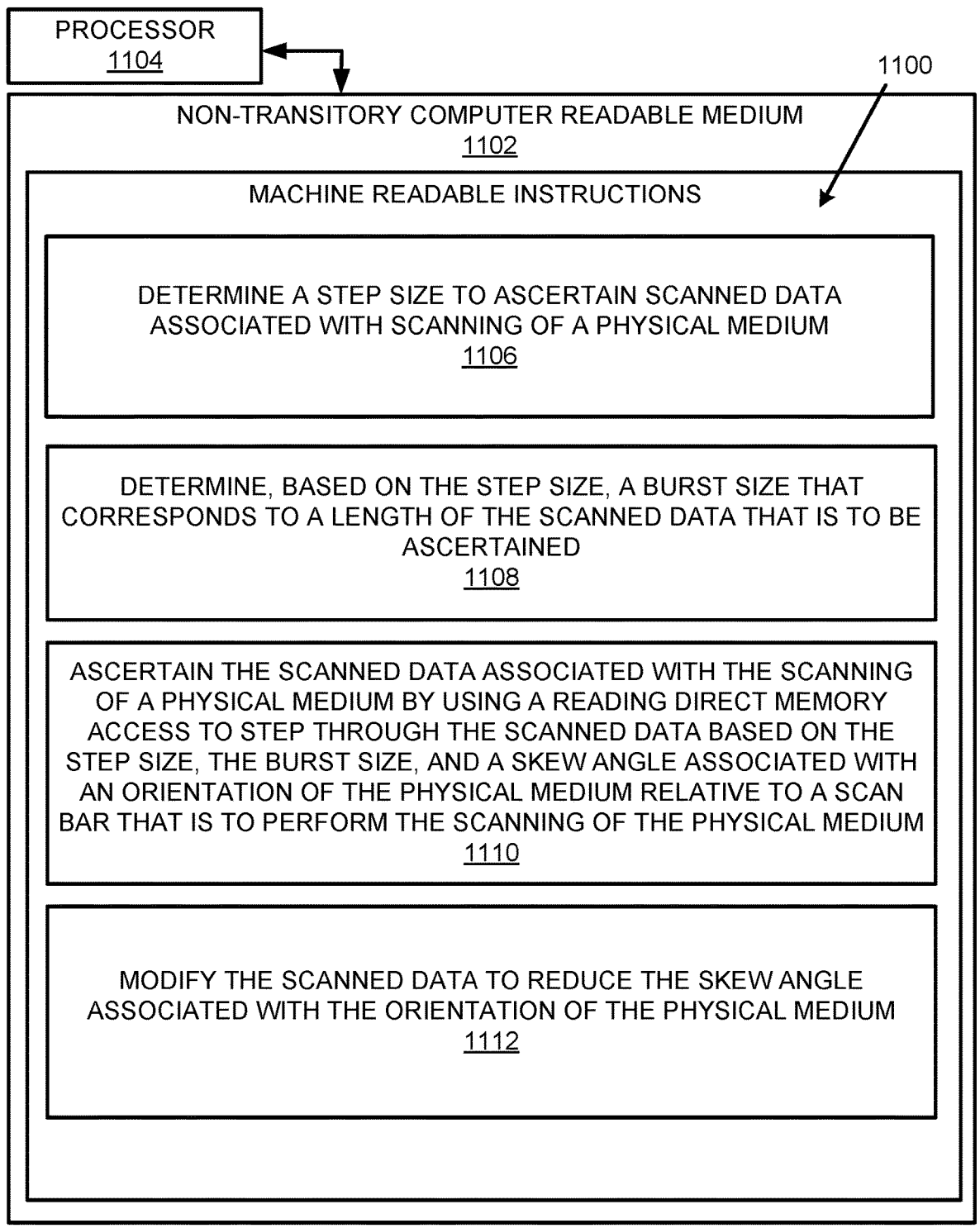
FIG. 11 illustrates a further block diagram for direct memory access based hardware deskew, according to an example of the present disclosure.

FIGS. 9-11 respectively illustrate a block diagram 900, a flowchart of a method 1000, and a further block diagram 1100 for direct memory access based hardware deskew, according to examples. The block diagram 900, the method 1000, and the block diagram 1100 may be implemented on the apparatus 100 described above with reference to FIG. 1 by way of example and not limitation. The block diagram 900, the method 1000, and the block diagram 1100 may be practiced in other apparatus. In addition to showing the block diagram 900, FIG. 9 shows hardware of the apparatus 100 that may execute the instructions of the block diagram 900. The hardware may include a processor 902, and a memory 904 storing machine readable instructions that when executed by the processor cause the processor to perform the instructions of the block diagram 900. The memory 904 may represent a non-transitory computer readable medium. FIG. 10 may represent a method for direct memory access based hardware deskew, and the steps of the method. FIG. 11 may represent a non-transitory computer readable medium 1102 having stored thereon machine readable instructions to provide direct memory access based hardware deskew. The machine readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for a processor may reside during runtime.

Referring to FIGS. 1-9, and particularly to the block diagram 900 shown in FIG. 9, at block 906, the memory 904 may include instructions to ascertain (e.g., by the skew correction module 102) scanned data 104 associated with scanning of a physical medium 106 by using a reading direct memory access 108 to step through the scanned data 104 based on a skew angle associated with an orientation of the physical medium 106 relative to a scan bar 110 that is to perform the scanning of the physical medium 106.

At block 908, the memory 904 may include instructions to modify (e.g., by the skew correction module 102) the scanned data 104 to reduce the skew angle associated with the orientation of the physical medium 106.

According to an example, the machine readable instructions to ascertain scanned data 104 associated with scanning of the physical medium 106 by using the reading direct memory access 108 to step through the scanned data 104 based on the skew angle associated with the orientation of the physical medium 106 relative to the scan bar 110 that is to perform the scanning of the physical medium 106 further comprise machine readable instructions to cause the processor to determine (e.g., by the scanned data reading module 118) a step size to ascertain the scanned data 104, where the step size includes two pixels to a size of an image determined from the scanning of the physical medium 106, and ascertain scanned data 104 associated with scanning of the physical medium 106 by using the reading direct memory access 108 to step through the scanned data 104 based on the step size and the skew angle associated with the orientation of the physical medium 106 relative to the scan bar 110 that is to perform the scanning of the physical medium 106.

According to an example, the machine readable instructions to modify the scanned data 104 to reduce the skew angle associated with the orientation of the physical medium 106 further comprise machine readable instructions to cause the processor to perform (e.g., by the skew correction module 102) a weighted average of four adjacent pixels of an image determined from the scanning of the physical medium 106 by generating a n×n pixel window, where n is greater than one.

According to an example, the machine readable instructions to ascertain scanned data 104 associated with scanning of the physical medium 106 by using the reading direct memory access 108 to step through the scanned data 104 based on the skew angle associated with the orientation of the physical medium 106 relative to the scan bar 110 that is to perform the scanning of the physical medium 106, and modify the scanned data 104 to reduce the skew angle associated with the orientation of the physical medium 106 further comprise machine readable instructions to cause the processor to determine (e.g., by the skew correction module 102) four adjacent pixels of an image determined from the scanning of the physical medium 106 by following a pair of skewed lines of the image by tracking horizontal and vertical coordinates of pixels of the image, where the coordinates of the pixels of the image are based on the skew angle, and perform (e.g., by the skew correction module 102) a weighted average of the four adjacent pixels by generating a n×n pixel window, where n is greater than one.

According to an example, the machine readable instructions to modify the scanned data 104 to reduce the skew angle associated with the orientation of the physical medium 106 further comprise machine readable instructions to cause the processor to process (e.g., by the skew correction module 102) a further pair of skewed lines of the image by following the further pair of skewed lines of the image by tracking the horizontal and vertical coordinates of pixels of the image, where the further pair of skewed lines of the image include one of the previously followed pair of skewed lines of the image.

According to an example, the machine readable instructions to ascertain scanned data 104 associated with scanning of the physical medium 106 by using the reading direct memory access 108 to step through the scanned data 104 based on the skew angle associated with the orientation of the physical medium 106 relative to the scan bar 110 that is to perform the scanning of the physical medium 106 further comprise machine readable instructions to cause the processor to ascertain (e.g., by the skew correction module 102) the scanned data 104 for a positively skewed image determined from the scanning of the physical medium 106 in a top down direction relative to an orientation of the image, where the positive skew represents a left to right skew in the image relative to the orientation of the image, and ascertain (e.g., by the skew correction module 102) the scanned data 104 for a negatively skewed image determined from the scanning of the physical medium 106 in a bottom up direction relative to the orientation of the image, where the negative skew represents a right to left skew in the image relative to the orientation of the image.

According to an example, the machine readable instructions to ascertain scanned data 104 associated with scanning of the physical medium 106 by using the reading direct memory access 108 to step through the scanned data 104 based on the skew angle associated with the orientation of the physical medium 106 relative to the scan bar 110 that is to perform the scanning of the physical medium 106 further comprise machine readable instructions to cause the processor to determine (e.g., by the scanned data reading module 118) a step size to ascertain the scanned data 104, where the step size includes two pixels to a size of an image determined from the scanning of the physical medium 106, and determine, based on the step size, a burst size that corresponds to a length of the scanned data 104 that is to be ascertained.

According to an example, the machine readable instructions, when executed by the processor, further cause the processor to determine (e.g., by the scanned data reading module 118) whether a vertical coordinate relative to the orientation of the physical medium 106 is off the physical medium 106, in response to a determination that the vertical coordinate relative to the orientation of the physical medium 106 is off the physical medium 106, determine that a side of the physical medium 106 is not scanned, and in response to a determination that the side of the physical medium 106 is not scanned, apply fill pixels to the scanned data 104 associated with the side of the physical that is not scanned.

Referring to FIGS. 1-8, and 10, and particularly FIG. 10, for the method 1000, at block 1002, the method may include determining a step size to ascertain (e.g., by the skew correction module 102) scanned data 104 associated with scanning of a physical medium 106. The step size may include two pixels to a size of an image determined from the scanning of the physical medium 106.

At block 1004, the method may include ascertaining (e.g., by the skew correction module 102) the scanned data 104 associated with the scanning of a physical medium 106 by using a reading direct memory access 108 to step through the scanned data 104 based on the step size and a skew angle associated with an orientation of the physical medium 106 relative to a scan bar 110 that is to perform the scanning of the physical medium 106.

At block 1006, the method may include modifying (e.g., by the skew correction module 102) the scanned data 104 to reduce the skew angle associated with the orientation of the physical medium 106.

Referring to FIGS. 1-8, and 11, and particularly FIG. 11, for the block diagram 1100, at block 1106, the non-transitory computer readable medium 1102 may include instructions to determine (e.g., by the scanned data reading module 118) a step size to ascertain scanned data 104 associated with scanning of a physical medium 106. The step size may include two pixels to a size of an image determined from the scanning of the physical medium 106.

At block 1108, the non-transitory computer readable medium 1102 may include instructions to determine (e.g., by the scanned data reading module 118), based on the step size, a burst size that corresponds to a length of the scanned data 104 that is to be ascertained.

At block 1110, the non-transitory computer readable medium 1102 may include instructions to ascertain (e.g., by the skew correction module 102) the scanned data 104 associated with the scanning of a physical medium 106 by using a reading direct memory access 108 to step through the scanned data 104 based on the step size, the burst size, and a skew angle associated with an orientation of the physical medium 106 relative to a scan bar 110 that is to perform the scanning of the physical medium 106.

At block 1112, the non-transitory computer readable medium 1102 may include instructions to modify (e.g., by the skew correction module 102) the scanned data 104 to reduce the skew angle associated with the orientation of the physical medium 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A direct memory access based hardware deskew apparatus comprising:
    a processor; and
    a memory storing machine readable instructions that when executed by the processor cause the processor to:
        ascertain scanned data associated with scanning of a physical medium by using a reading direct memory access to step through the scanned data continuously to an end of each line until an end of the physical medium is reached and based on a step size and a skew angle associated with an orientation of the physical medium relative to a scan bar that is to perform the scanning of the physical medium; and
        modify the scanned data to reduce the skew angle associated with the orientation of the physical medium.

2. The apparatus according to claim 1, wherein the machine readable instructions further cause the processor to:
    determine a step size to ascertain the scanned data, wherein the step size includes two pixels to a size of an image determined from the scanning of the physical medium; and
    ascertain scanned data associated with scanning of the physical medium by using the reading direct memory access to step through the scanned data based on the step size and the skew angle associated with the orientation of the physical medium relative to the scan bar that is to perform the scanning of the physical medium.

3. The apparatus according to claim 1, wherein the machine readable instructions cause the processor to:
    perform a weighted average of four adjacent pixels of an image determined from the scanning of the physical medium by generating a n×n pixel window, where n is greater than one.

4. The apparatus according to claim 1, wherein the machine readable instructions
    further cause the processor to:
    determine four adjacent pixels of an image determined from the scanning of the physical medium by following a pair of skewed lines of the image by tracking horizontal and vertical coordinates of pixels of the image, wherein the horizontal and vertical coordinates of the pixels of the image are based on the skew angle; and
    perform a weighted average of the four adjacent pixels by generating a n×n pixel window, where n is greater than one.

5. The apparatus according to claim 4, wherein the machine readable instructions further cause the processor to:
    process a further pair of skewed lines of the image by tracking the horizontal and vertical coordinates of pixels of the image, wherein the further pair of skewed lines of the image include the followed pair of skewed lines of the image.

6. The apparatus according to claim 1, wherein the machine readable instructions further cause the processor to:
    ascertain the scanned data for a positively skewed image determined from the scanning of the physical medium in a top down direction relative to the orientation of the image, wherein the positive skew represents a left to right skew in the image relative to the orientation of the image; and
    ascertain the scanned data for a negatively skewed image determined from the scanning of the physical medium in a bottom up direction relative to the orientation of the image, wherein the negative skew represents a right to left skew in the image relative to the orientation of the image.

7. The apparatus according to claim 1, wherein the machine readable instructions further cause the processor to:
    determine a step size to ascertain the scanned data, wherein the step size includes two pixels to a size of an image determined from the scanning of the physical medium; and
    determine, based on the step size, a burst size that corresponds to a length of the scanned data that is to be ascertained.

8. The apparatus according to claim 1, wherein the machine readable instructions, when executed by the processor, further cause the processor to:
    determine whether a vertical coordinate relative to the orientation of the physical medium is off the physical medium;
    in response to a determination that the vertical coordinate relative to the orientation of the physical medium is off the physical medium, determine that a side of the physical medium is not scanned; and in response to a determination that the side of the physical medium is not scanned, apply fill pixels to the scanned data associated with the side of the physical that is not scanned.

9. A method for direct memory access based hardware deskew comprising:
determining, by a processor, a step size to ascertain scanned data associated with scanning of a physical medium, wherein the step size includes two pixels to a size of an image determined from the scanning of the physical medium;
ascertaining the scanned data associated with the scanning of a physical medium by using a reading direct memory access to step through the scanned data continuously to an end of each line until an end of the physical medium is reached and based on the step size and a skew angle associated with an orientation of the physical medium relative to a scan bar that is to perform the scanning of the physical medium; and
modifying the scanned data to reduce the skew angle associated with the orientation of the physical medium.

10. The method according to claim 9, wherein the modifying further comprises:
performing a weighted average of four adjacent pixels of the image determined from the scanning of the physical medium by generating a n×n pixel window, where n is greater than one.

11. The method according to claim 9, wherein the ascertaining and the modifying further comprises:
determining four adjacent pixels of the image determined from the scanning of the physical medium by following a pair of skewed lines of the image by tracking horizontal and vertical coordinates of pixels of the image, wherein the coordinates of the pixels of the image are based on the skew angle; and
performing a weighted average of the four adjacent pixels by generating a n×n pixel window, where n is greater than one.

12. The method according to claim 11, wherein the modifying further comprises:
processing a further pair of skewed lines of the image by following the further pair of skewed lines of the image by tracking the horizontal and vertical coordinates of pixels of the image, wherein the further pair of skewed lines of the image include the followed pair of skewed lines of the image.

13. A non-transitory computer readable medium having stored thereon machine readable instructions to provide direct memory access based hardware deskew, the machine readable instructions, when executed, cause a processor to:
determine a step size to ascertain scanned data associated with scanning of a physical medium, wherein the step size includes two pixels to a size of an image determined from the scanning of the physical medium;
determine, based on the step size, a burst size that corresponds to a length of the scanned data that is to be ascertained;
ascertain the scanned data associated with the scanning of a physical medium by using a reading direct memory access to step through the scanned data based on the step size, the burst size, and a skew angle associated with an orientation of the physical medium relative to a scan bar that is to perform the scanning of the physical medium; and modify the scanned data to reduce the skew angle associated with the orientation of the physical medium.

14. The non-transitory computer readable medium according to claim 13, wherein the machine readable instructions to ascertain the scanned data further cause the processor to:
ascertain the scanned data for a positively skewed image determined from the scanning of the physical medium in a top down direction relative to the orientation of the image, wherein the positive skew represents a left to right skew in the image relative to the orientation of the image; and
ascertain the scanned data for a negatively skewed image determined from the scanning of the physical medium in a bottom up direction relative to the orientation of the image, wherein the negative skew represents a right to left skew in the image relative to the orientation of the image.

15. The non-transitory computer readable medium according to claim 13, further comprising machine readable instructions, when executed, further cause the processor to:
determine whether a vertical coordinate relative to the orientation of the physical medium is off the physical medium;
in response to a determination that the vertical coordinate relative to the orientation of the physical medium is off the physical medium, determine that a side of the physical medium is not scanned; and
in response to a determination that the side of the physical medium is not scanned, apply fill pixels to the scanned data associated with the side of the physical that is not scanned.

16. The non-transitory computer readable medium according to claim 13, further comprising machine readable instructions, when executed, further cause the processor to:
determine four adjacent pixels of an image determined from the scanning of the physical medium by following a pair of skewed lines of the image by tracking horizontal and vertical coordinates of pixels of the image, wherein the horizontal and vertical coordinates of the pixels of the image are based on the skew angle; and
perform a weighted average of the four adjacent pixels by generating a n×n pixel window, where n is greater than one.

17. The non-transitory computer readable medium according to claim 16, further comprising machine readable instructions, when executed, further cause the processor to:
process a further pair of skewed lines of the image by tracking the horizontal and vertical coordinates of pixels of the image, wherein the further pair of skewed lines of the image include the followed pair of skewed lines of the image.

18. The apparatus according to claim 7, wherein the machine readable instructions further cause the processor to:
continuously or intermittently determine the burst size that is needed for a particular transaction.

19. The method according to claim 9, further comprising:
continuously or intermittently determining a burst size that is needed for a particular transaction.

20. The non-transitory computer readable medium according to claim 13, further comprising machine readable instructions, when executed, further cause the processor to:
continuously or intermittently determine the burst size that is needed for a particular transaction.

* * * * *